(12) United States Patent
Ishitani et al.

(10) Patent No.: US 7,687,988 B2
(45) Date of Patent: Mar. 30, 2010

(54) DISPLAY DEVICE

(75) Inventors: Tetsuji Ishitani, Kanagawa (JP); Yuji Egi, Kanagawa (JP); Takeshi Nishi, Kanagawa (JP); Koji Moriya, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 452 days.

(21) Appl. No.: 11/553,747

(22) Filed: Oct. 27, 2006

(65) Prior Publication Data

US 2007/0121033 A1 May 31, 2007

(30) Foreign Application Priority Data

Nov. 4, 2005 (JP) .............................. 2005-321534

(51) Int. Cl.
*H01J 1/62* (2006.01)
(52) U.S. Cl. ....................................... 313/506; 313/479
(58) Field of Classification Search ................. 313/479, 313/111, 112, 498, 506, 509, 512
See application file for complete search history.

(56) References Cited

U.S. PATENT DOCUMENTS

| | | | |
|---|---|---|---|
| 4,592,623 A | 6/1986 | Yamamoto et al. | |
| 4,968,120 A | 11/1990 | Depp et al. | |
| 5,050,965 A | 9/1991 | Conner et al. | |
| 5,142,393 A * | 8/1992 | Okumura et al. | ............ 349/121 |
| 5,237,438 A | 8/1993 | Miyashita et al. | |
| 5,305,143 A | 4/1994 | Taga et al. | |
| 5,583,677 A | 12/1996 | Ito et al. | |
| 5,831,375 A | 11/1998 | Benson, Jr. | |
| 6,023,317 A | 2/2000 | Xu et al. | |
| 6,147,734 A | 11/2000 | Kashima | |
| 6,201,592 B1 * | 3/2001 | Terashita et al. | ............ 349/156 |
| 6,577,361 B1 | 6/2003 | Sekiguchi et al. | |
| 6,646,698 B2 | 11/2003 | Mori | |
| 6,706,339 B1 | 3/2004 | Miyatake et al. | |
| 6,765,721 B2 | 7/2004 | Kawazu et al. | |
| 6,816,217 B2 | 11/2004 | Sone | |
| 6,897,916 B2 | 5/2005 | Hamamoto | |
| 6,934,081 B2 | 8/2005 | Higashio et al. | |
| 6,970,218 B2 | 11/2005 | Fukuda et al. | |

(Continued)

FOREIGN PATENT DOCUMENTS

EP 0 365 778 5/1990

(Continued)

OTHER PUBLICATIONS

European Search Report (Application No. 06022862.4) dated Mar. 6, 2007, 6 pages.

(Continued)

*Primary Examiner*—Vip Patel
(74) *Attorney, Agent, or Firm*—Fish & Richardson P.C.

(57) ABSTRACT

The invention provides a display device of which a contrast ratio is enhanced. By providing stacked polarizing plates so as to be in a cross nicol state, a contrast ratio of a display device can be enhanced. The stacked polarizing plates are stacked outside a light-transmissive insulating substrate in a parallel nicol state. When the number of polarizing plates is four or five in total, a contrast ratio becomes the highest.

24 Claims, 11 Drawing Sheets

U.S. PATENT DOCUMENTS

| | | |
|---|---|---|
| 6,985,291 B2 | 1/2006 | Watson et al. |
| 7,015,990 B2 | 3/2006 | Yeh et al. |
| 7,057,682 B2 | 6/2006 | Watson et al. |
| 7,059,718 B2 | 6/2006 | Masterson |
| 7,126,659 B2 | 10/2006 | Fukuda et al. |
| 7,144,608 B2 | 12/2006 | Paukshto et al. |
| 7,161,185 B2 | 1/2007 | Yamazaki et al. |
| 7,161,649 B2 | 1/2007 | Lee et al. |
| 7,175,898 B2 | 2/2007 | Lühmann et al. |
| 7,176,619 B2 | 2/2007 | Miyachi et al. |
| 7,176,999 B2 | 2/2007 | Miyachi |
| 7,265,383 B2 | 9/2007 | Yamazaki et al. |
| 7,301,591 B2 | 11/2007 | Akiyama |
| 7,307,679 B2 | 12/2007 | Toyooka et al. |
| 7,315,338 B2 | 1/2008 | Yeh et al. |
| 7,317,279 B2 | 1/2008 | Chen |
| 7,324,180 B2 | 1/2008 | Kashima |
| 7,333,077 B2 | 2/2008 | Koyama et al. |
| 7,339,316 B2 | 3/2008 | Adachi et al. |
| 7,375,464 B2 | 5/2008 | Chin et al. |
| 7,453,640 B2 | 11/2008 | Yeh et al. |
| 7,468,769 B2 | 12/2008 | Nakagawa |
| 2002/0159003 A1 | 10/2002 | Sato et al. |
| 2002/0186469 A1 | 12/2002 | Kawazu et al. |
| 2003/0053011 A1 | 3/2003 | Mori |
| 2004/0141122 A1 | 7/2004 | Nakagawa |
| 2004/0227698 A1 | 11/2004 | Yamazaki et al. |
| 2004/0239658 A1 | 12/2004 | Koyama et al. |
| 2004/0251823 A1 | 12/2004 | Park et al. |
| 2004/0257497 A1 | 12/2004 | Paukshto et al. |
| 2004/0263056 A1 | 12/2004 | Seo et al. |
| 2004/0263066 A1 | 12/2004 | Abe et al. |
| 2005/0024339 A1 | 2/2005 | Yamazaki et al. |
| 2005/0093438 A1 | 5/2005 | Chen |
| 2005/0127820 A1 | 6/2005 | Yamazaki et al. |
| 2005/0157225 A1 | 7/2005 | Toyooka et al. |
| 2005/0157255 A1 | 7/2005 | Masterson |
| 2005/0179835 A1 | 8/2005 | Lee et al. |
| 2006/0007376 A1 | 1/2006 | Fukuda et al. |
| 2006/0055847 A1 | 3/2006 | Yamazaki et al. |
| 2006/0114375 A1 | 6/2006 | Yeh et al. |
| 2006/0114384 A1 | 6/2006 | Yeh et al. |
| 2006/0158096 A1 | 7/2006 | Adachi et al. |
| 2006/0164571 A1 | 7/2006 | Broer et al. |
| 2006/0215096 A1 | 9/2006 | Iwamoto et al. |
| 2007/0014009 A1 | 1/2007 | Cross et al. |
| 2007/0054066 A1 | 3/2007 | Usukura et al. |
| 2007/0120475 A1 | 5/2007 | Ishitani et al. |
| 2007/0126962 A1 | 6/2007 | Egi et al. |
| 2007/0146579 A1 | 6/2007 | Egi et al. |
| 2007/0146580 A1 | 6/2007 | Ishitani et al. |
| 2007/0159044 A1 | 7/2007 | Ishitani et al. |
| 2007/0177071 A1 | 8/2007 | Egi et al. |
| 2007/0177084 A1 | 8/2007 | Ishitani et al. |
| 2007/0177086 A1 | 8/2007 | Ishitani et al. |
| 2007/0182885 A1 | 8/2007 | Egi et al. |
| 2007/0200977 A1 | 8/2007 | Egi et al. |
| 2007/0200978 A1 | 8/2007 | Ishitani et al. |
| 2007/0285777 A1 | 12/2007 | Toyoshima et al. |

FOREIGN PATENT DOCUMENTS

| | | |
|---|---|---|
| EP | 1 152 282 | 11/2001 |
| JP | 62-206524 | 9/1987 |
| JP | 64-082014 | 3/1989 |
| JP | 03-257429 | 11/1991 |
| JP | 05-034731 | 2/1993 |
| JP | 05-100114 | 4/1993 |
| JP | 06-222357 | 8/1994 |
| JP | 07-181476 | 7/1995 |
| JP | 2761453 | 6/1998 |
| JP | 10-255976 | 9/1998 |
| JP | 2000-180843 | 6/2000 |
| JP | 2000-249832 | 9/2000 |
| JP | 3174367 | 6/2001 |
| JP | 2001-242320 | 9/2001 |
| JP | 2002-277867 | 9/2002 |
| JP | 2003-172819 | 6/2003 |
| JP | 2003172819 A | 6/2003 |
| JP | 2003-279963 | 10/2003 |
| JP | 2004-354818 | 12/2004 |
| WO | WO 00/34821 | 6/2000 |
| WO | WO-2004/036272 | 4/2004 |
| WO | WO2005050269 A1 | 6/2005 |

OTHER PUBLICATIONS

J. Chen et al., "21.2: Optimum Film Compensation Modes for TN and VA LCDS," SID Digest '98, SID International Symposium Digest of Technical Papers, 1998, pp. 315-318.

P. Lazarev et al., "P-116: Thin Crystal Films (TCF) for LCD Contrast Enhancement," SID Digest '03, SID International Symposium Digest of Technical Papers, 2003, pp. 669-671.

Office Action (U.S. Appl. No. 11/565,976) dated Nov. 4, 2008.

Office Action (U.S. Appl. No. 11/565,976) dated Apr. 17, 2009.

Office Action (U.S. Appl. No. 11/565,976) dated Sep. 23, 2009.

* cited by examiner

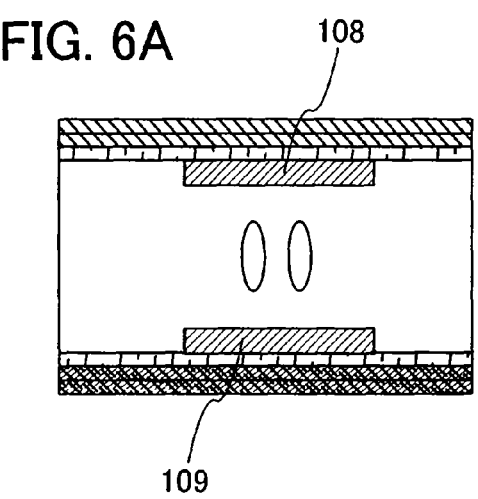 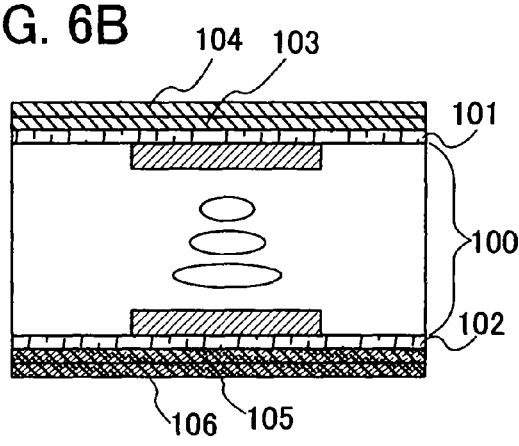

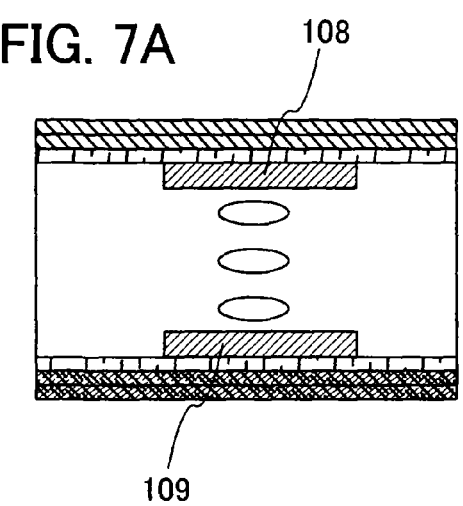
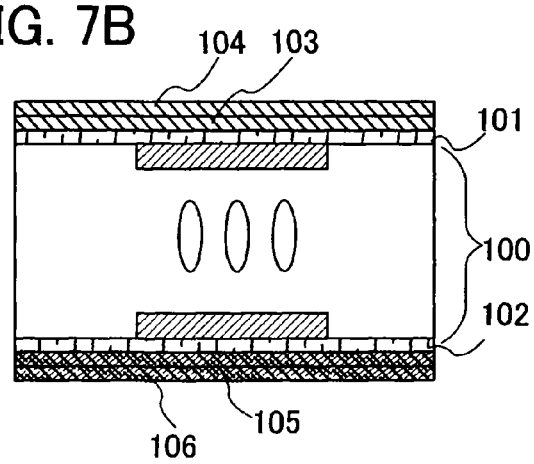

FIG. 8A
FIG. 8B
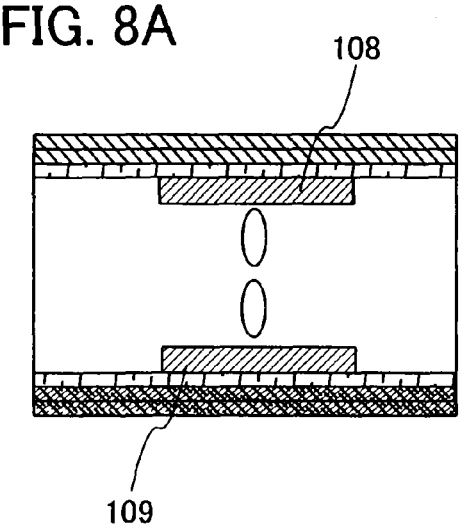
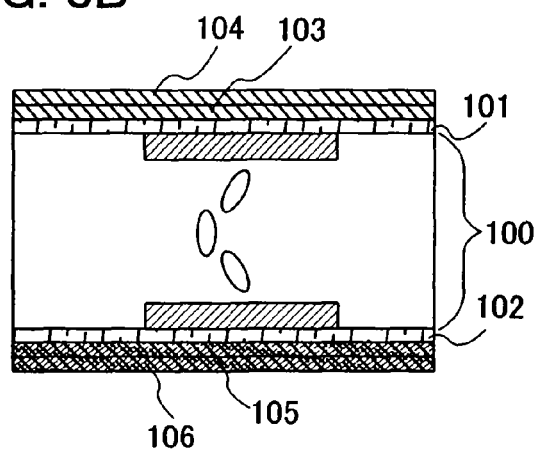

111  112

101
100
102
106  105

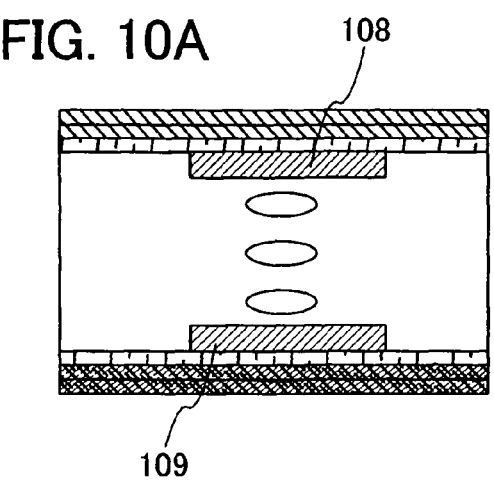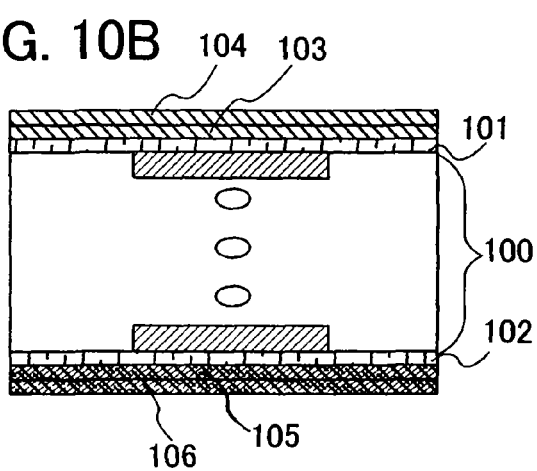
FIG. 10A
FIG. 10B

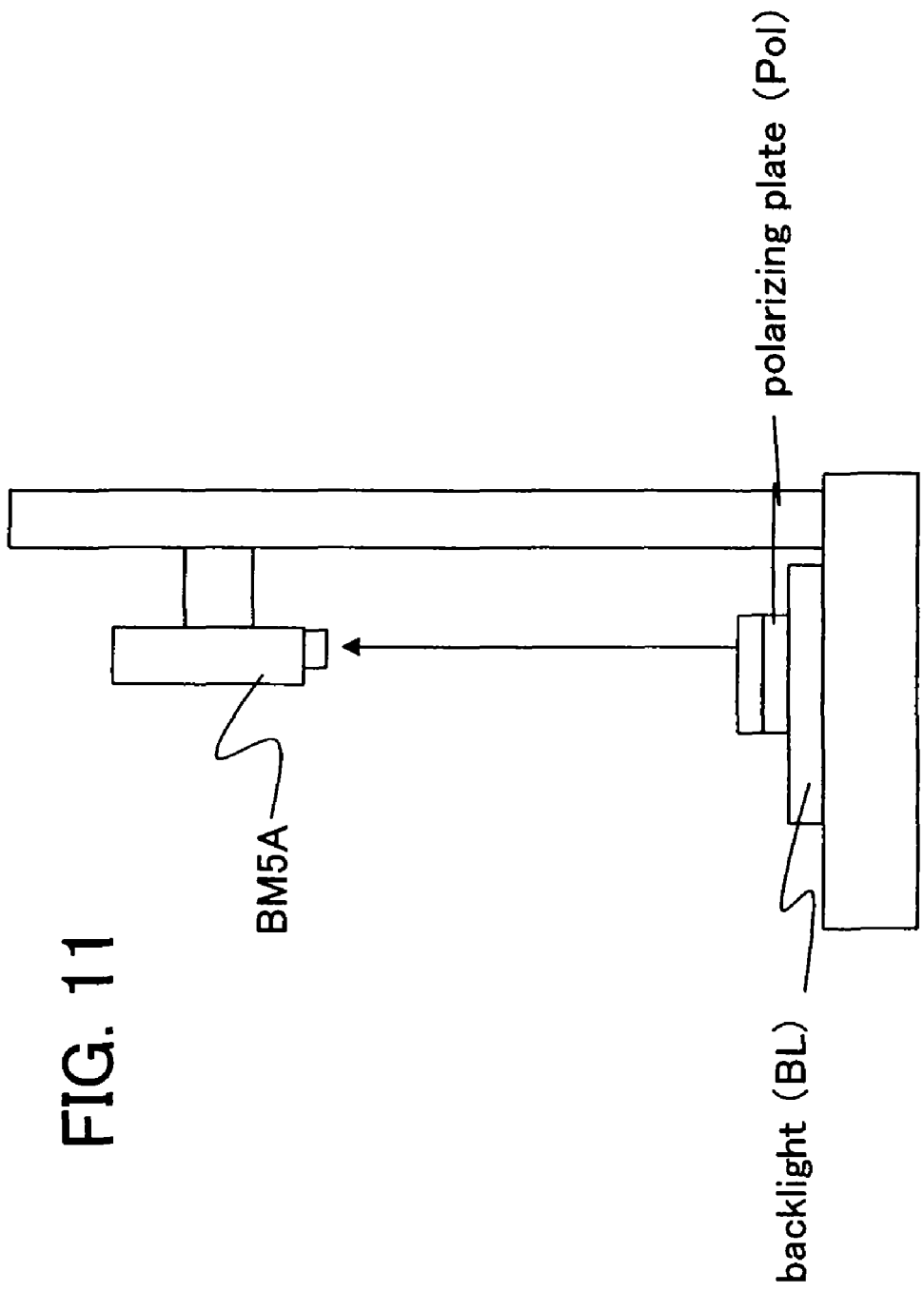

DISPLAY DEVICE

BACKGROUND OF THE INVENTION

1. Field of the Invention

The present invention relates to a configuration of a display device for enhancing a contrast ratio.

2. Description of the Related Art

A display device which is very thin and lightweight as compared to the conventional cathode-ray tube display device, a so-called flat panel display, has been developed. A liquid crystal display device having a liquid crystal element as a display element, a light emitting device having a self-light emitting element, an FED (field emission display) using an electron beam, and the like compete in the market of flat panel displays. Therefore, lower power consumption and a higher contrast ratio are required in order to increase the added value and differentiate from other products.

In general, a liquid crystal display device is provided with one polarizing plate over each of substrates to keep a contrast ratio. The higher the contrast ratio is, the more clearly black display is performed. Therefore, higher display quality can be provided when an image is seen in a dark room such as a home theater room.

For example, it is suggested that a first polarizing plate is provided outside a substrate on a viewing side of a liquid crystal cell, a second polarizing plate is provided outside a substrate facing that on the viewing side, and a third polarizing plate is provided for heightening the polarization degree when light from an auxiliary light source provided on the substrate side polarizes through the second polarizing plate and passes the liquid crystal cell, in order to improve unevenness of display and a contrast ratio which are caused due to shortage of polarization degree and polarization distribution of polarizing plates (see Patent Document 1). [Patent Document 1] PCT International Publication No. 00/34821

SUMMARY OF THE INVENTION

However, a contrast ratio still has been required to be enhanced and researches have been made for enhancement of contrast in a liquid crystal display device. Further, it is a problem that a polarizing plate having a high polarization degree is expensive.

In view of the aforementioned problems, the invention has a feature in that a plurality of polarizing plates are provided over each of light-transmissive substrates arranged so as to face each other. The plurality of polarizing plates can have a stacked-layer structure, and a wave plate and a retardation film may be provided between the stacked polarizing plates and the substrates.

Hereinafter, a specific structure of the invention is described.

One mode of the invention is a display device including a display element sandwiched between a first light-transmissive substrate and a second light-transmissive substrate which are provided so as to face each other; and polarizing plates stacked outside the first light-transmissive substrate or the second light-transmissive substrate, in which the stacked polarizing plates are arranged so that absorption axes of the stacked polarizing plates are arranged so as to be in a parallel nicol state.

Another mode of the invention is a display device including a display element sandwiched between a first light-transmissive substrate and a second light-transmissive substrate which are provided so as to face each other; and polarizing plates stacked outside the first light-transmissive substrate and the second light-transmissive substrate, in which absorption axes of the stacked polarizing plates are arranged so as to be in a parallel nicol state, and absorption axes of the polarizing plates stacked outside the first light-transmissive substrate and the second light-transmissive substrate are arranged so as to be in a cross nicol state.

Another mode of the invention is a display device including a display element sandwiched between a first light-transmissive substrate and a second light-transmissive substrate which are provided so as to face each other; a color filter provided inside the first light-transmissive substrate or the second light-transmissive substrate; and polarizing plates stacked outside the first light-transmissive substrate and the second light-transmissive substrate, in which absorption axes of the stacked polarizing plates are arranged so as to be in a parallel nicol state, and absorption axes of the polarizing plates stacked outside the first light-transmissive substrate and the second light-transmissive substrate are arranged so as to be in a cross nicol state.

Another mode of the invention is a display device including a display element sandwiched between a first light-transmissive substrate and a second light-transmissive substrate which are provided so as to face each other; and polarizing plates stacked outside the first light-transmissive substrate and the second light-transmissive substrate, in which absorption axes of the stacked polarizing plates are arranged so as to be in a parallel nicol state, absorption axes of the polarizing plates stacked outside the first light-transmissive substrate and the second light-transmissive substrate are arranged so as to be in a cross nicol state, and a change in transmittance in the case where the polarizing plates stacked outside the first light-transmissive substrate and the polarizing plates stacked outside the second light-transmissive substrate are arranged so as to be in a parallel nicol state is greater than that in the case where the same are arranged so as to be in a cross nicol state.

Another mode of the invention is a display device including a display element sandwiched between a first light-transmissive substrate and a second light-transmissive substrate which are provided so as to face each other; and polarizing plates stacked outside the first light-transmissive substrate and the second light-transmissive substrate, in which absorption axes of the stacked polarizing plates are arranged so as to be in a parallel nicol state, absorption axes of the polarizing plates stacked outside the first light-transmissive substrate and the second light-transmissive substrate are arranged so as to be in a cross nicol state, and a ratio of transmittance in the case where the polarizing plates stacked outside the first light-transmissive substrate and the polarizing plates stacked outside the second light-transmissive substrate are arranged so as to be in a parallel nicol state to transmittance in the case where the same are arranged so as to be in a cross nicol state is higher than a ratio of transmittance in the case where a single-layer polarizing plate provided outside the first light-transmissive substrate and a single-layer polarizing plate provided outside the second light-transmissive substrate are arranged so as to be in a parallel nicol state to transmittance in the case where they are arranged so as to be in a cross nicol state.

In the invention, as the stacked polarizing plates, a first polarizing plate and a second polarizing plate are provided in contact with each other.

In the invention, the display element is a liquid crystal element.

A contrast ratio of a display device can be enhanced with a simple structure where a plurality of polarizing plates are provided.

BRIEF DESCRIPTION OF DRAWINGS

FIGS. 6A and 6B are views each showing a mode of a display device of the invention.

FIGS. 7A and 7B are views each showing a mode of a display device of the invention.

FIGS. 8A and 8B are views each showing a mode of a display device of the invention.

FIGS. 10A and 10B are views each showing a mode of a display device of the invention.

FIG. 11 is a diagram showing a measurement system.

DETAILED DESCRIPTION OF THE INVENTION

Figure 1A:
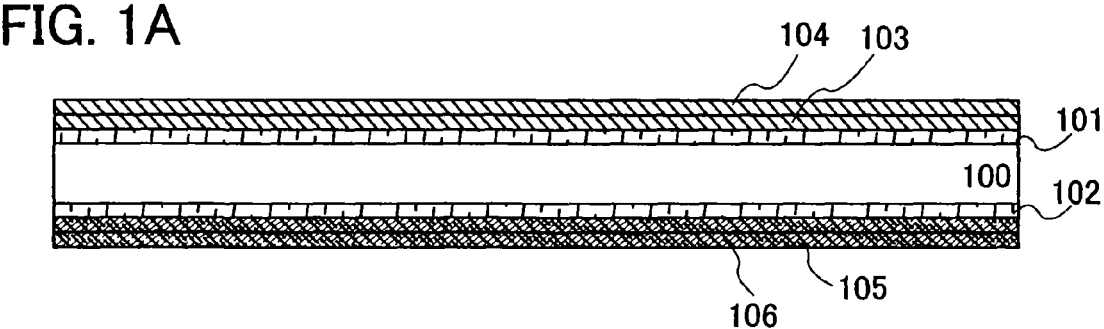
FIGS. 1A and 1B are views each showing a display device of the invention.

Although the invention will be fully described by way of embodiment modes and embodiments with reference to the accompanying drawings, it is to be easily understood that various changes and modifications in the mode and detail will be apparent to those skilled in the art. Therefore, unless such changes and modifications depart from the spirit and the scope of the invention, they should be construed as being included therein. It is to be noted that identical portions and portions having similar functions are denoted by the same reference numerals in all drawings for showing embodiment modes, and repetitive description thereof is omitted.

Embodiment Mode 1

In this embodiment mode, description is made of a concept of a display device of the invention.

Figure 1B:
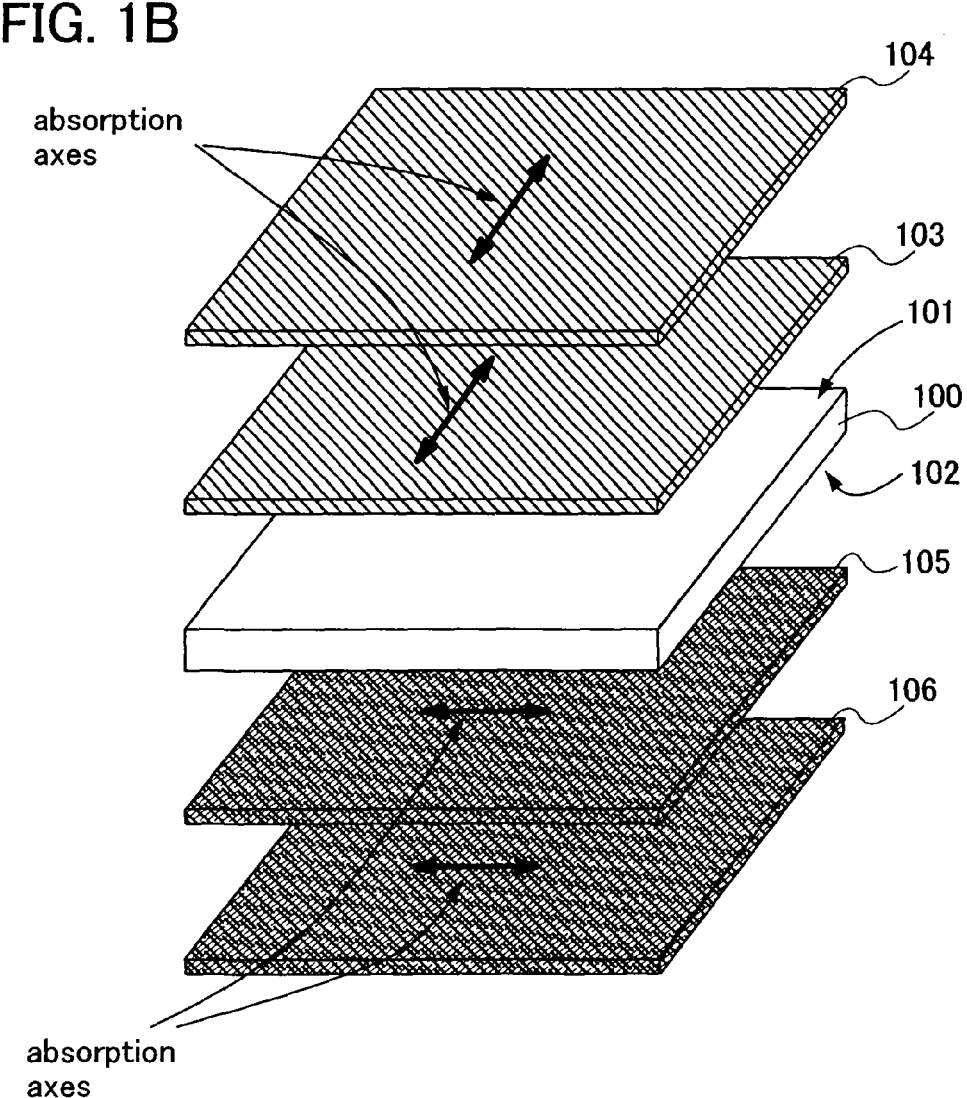

FIG. 1A shows a cross-sectional view of a display device provided with a polarizing plate having a stacked-layer structure, and FIG. 1B shows a perspective view of the display device. In this embodiment mode, description is made by taking a liquid crystal display device having a liquid crystal element as a display element, as an example.

As shown in FIG. 1A, a layer 100 having a liquid crystal element is sandwiched between a first substrate 101 and a second substrate 102 which are arranged so as to face each other. The substrate is a light-transmissive insulating substrate (hereinafter also referred to as a light-transmissive substrate). The substrates can be formed of, for example, a glass substrate such as barium borosilicate glass or aluminoborosilicate glass, a quartz substrate, or the like. Further, a substrate formed of plastic represented by polyethylene terephthalate (PET), polyethylene naphthalate (PEN), and polyether sulfone (PES), or a synthetic resin having flexibility such as acrylic can be applied to the substrates.

Stacked polarizing plates are provided outside the substrates, that is, on sides which are not in contact with the layer having a liquid crystal element. A first polarizing plate 103 and a second polarizing plate 104 are provided on the first substrate 101 side, whereas a third polarizing plate 105 and a fourth polarizing plate 106 are provided on the second substrate 102 side.

The polarizing plates can be formed of a known material. For example, a structure where an adhesive layer, TAC (triacetylcellulose), a mixed layer of PVA (polyvinyl alcohol) and iodine, and TAC are sequentially stacked from the substrate side can be used. Polarization degree can be controlled by the mixed layer of PVA (polyvinyl alcohol) and iodine. Further, a polarizing plate may also be referred to as a polarizing film due to its shape.

As shown in FIG. 1B, the first polarizing plate 103 and the second polarizing plate 104 are stacked so that absorption axes thereof are parallel to each other. This parallel state is referred to as a parallel nicol state. In a similar manner, the third polarizing plate 105 and the fourth polarizing plate 106 are stacked so that absorption axes thereof are arranged in parallel, that is, arranged so as to be in a parallel nicol state. The stacked polarizing plates of one side and the stacked polarizing plates of the other side are arranged so that absorption axes thereof are perpendicular to each other. This perpendicular state is referred to as a cross nicol state.

Note that a polarizing plate has a transmissive axis in a direction perpendicular to an absorption axis, as characteristics. Therefore, the case where transmissive axes are parallel to each other can also be referred to as a parallel nicol state. Meanwhile, the case where transmissive axes are perpendicular to each other can also be referred to as a cross nicol state.

By thus stacking polarizing plates so that absorption axes of the polarizing plates are in a parallel nicol state, light leakage in a direction of the absorption axes can be prevented. Further, by arranging stacked polarizing plates of one side and stacked polarizing plates of the other side so as to be in a cross nicol state, light leakage can be reduced as compared to the case where a single-layer polarizing plate of one side and a single-layer polarizing plate of the other side are provided so as to be in a cross nicol state. Accordingly, a contrast ratio of the display device can be enhanced.

Embodiment Mode 2

In this embodiment mode, a specific structure of a liquid crystal display device is described.

Figure 2:
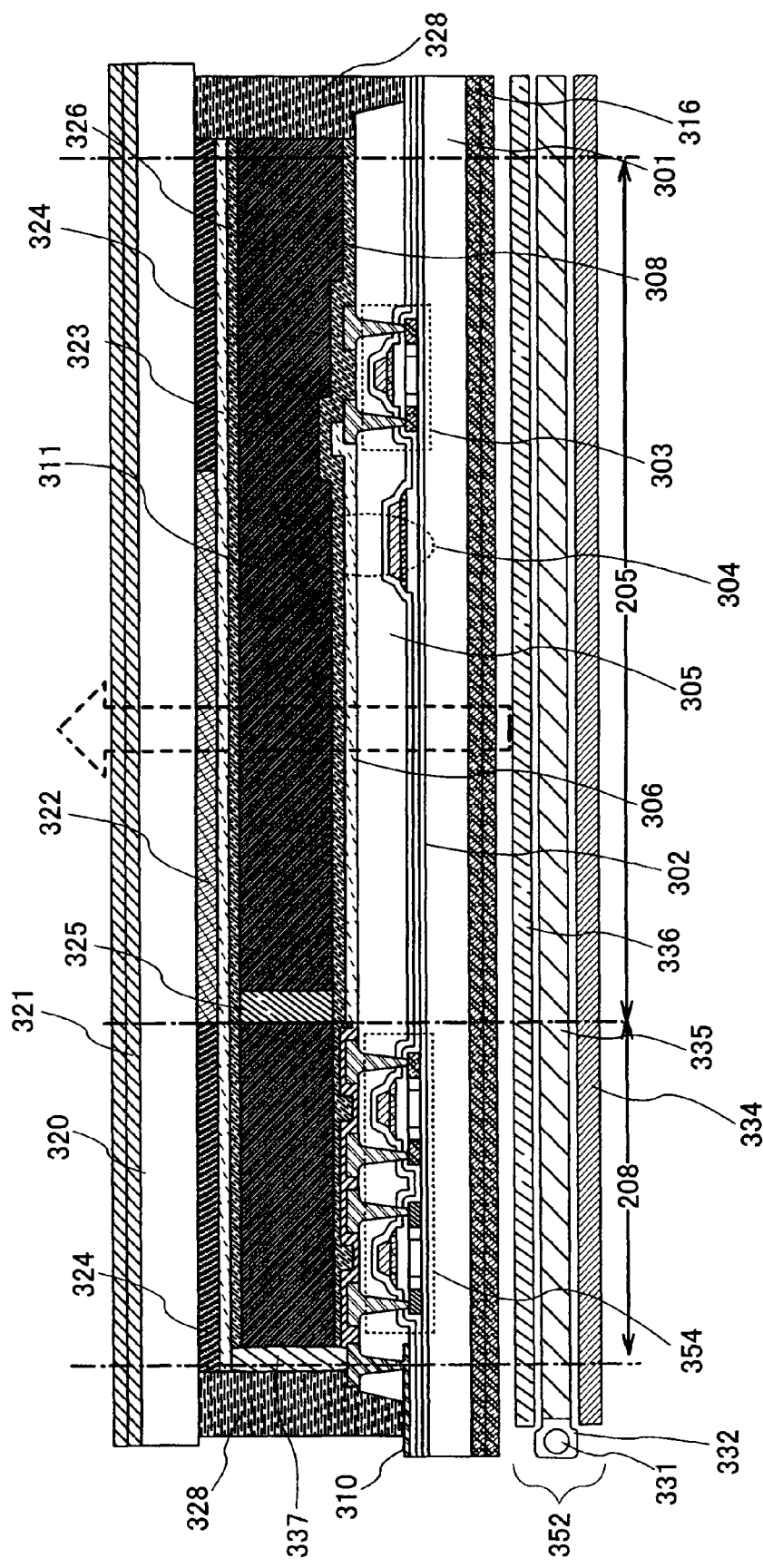
FIG. 2 is a cross sectional view showing a display device of the invention.

FIG. 2 shows a cross sectional view of a liquid crystal display device provided with a polarizing plate having a stacked-layer structure.

The liquid crystal display device includes a pixel portion 205 and a driver circuit portion 208. In the pixel portion 205 and the driver circuit portion 208, a base film 302 is provided over a substrate 301. An insulating substrate similar to the aforementioned embodiment mode can be used as the substrate 301. It is concerned that a substrate formed of a synthetic resin generally has a lower allowable temperature limit than other substrates; however, it can be employed by displacing after a manufacturing process using a higher heat-resistant substrate.

The pixel portion 205 is provided with a transistor as a switching element with the base film 302 interposed therebetween. In this embodiment mode, a thin film transistor (TFT) is used as the transistor, which is referred to as a switching TFT 303. A TFT can be formed by many methods. For example, a crystalline semiconductor film is used as an active layer. A gate electrode is provided over the crystalline semiconductor film with a gate insulating film interposed therebetween. An impurity element can be added to the active layer by using the gate electrode. Since an impurity element is added using the gate electrode in this manner, a mask for adding the impurity element is not required to be formed. The gate electrode may have a single layer structure or a stacked-layer structure. An impurity region can be formed as a high concentration impurity region and a low concentration impurity region by controlling the concentration thereof. Such a TFT having a low concentration impurity region is referred to as an LDD (Lightly Doped Drain) structure. The low concentration impurity region can be formed so as to overlap the gate electrode. Such a TFT is referred to as a GOLD (Gate Overlapped LDD) structure. In FIG. 2, the switching TFT 303 having a GOLD structure is shown. The polarity of the switching TFT 303 is an n-type as phosphorus (P) or the like is used for an impurity region thereof. In the case of forming a p-type TFT, boron (B) or the like may be added. After that, a protective film covering a gate electrode and the like is formed. A dangling bond in the crystalline semiconductor film can be terminated by hydrogen elements mixed in the protective film. Further, in order to enhance the flatness, an interlayer insulating film 305 may be formed. The interlayer insulating film 305 may be formed using an organic material, an inorganic material, or a stacked structure of these. Openings are formed in the interlayer insulating film 305, the protective film, and the gate insulating film; thereby wires connected to the impurity regions are formed. In this manner, the switching TFT 303 can be formed. It is to be noted that the invention is not limited to the structure of the switching TFT 303.

Then, a pixel electrode 306 connected to the wire is formed.

Further, a capacitor 304 can be formed at the same time as the switching TFT 303. In this embodiment mode, the capacitor 304 is formed of a stack of a conductive film formed at the same time as the gate electrode, the protective film, the interlayer insulating film 305, and the pixel electrode 306.

Further, a pixel portion and a driver circuit portion can be formed over one substrate by using a crystalline semiconductor film. In that case, transistors in the pixel portion and transistors in the driver circuit portion 208 are formed at the same time. The transistors used for the driver circuit portion 208 form a CMOS circuit; therefore, they are referred to as a CMOS circuit 354. Each TFT which forms the CMOS circuit 354 may have a similar structure to the switching TFT 303. Further, the LDD structure can be used instead of the GOLD structure, and a similar structure is not necessarily required.

An alignment film 308 is formed so as to cover the pixel electrode 306. The alignment film 308 is subjected to rubbing treatment. This rubbing treatment is not performed in some cases in a specific mode of a liquid crystal. For example, the treatment is not required to be performed in the case of a VA mode.

Next, a counter substrate 320 is provided. A color filter 322 and a black matrix (BM) 324 can be provided inside the counter substrate 320, that is on the side which is in contact with a liquid crystal. These can be formed by known methods; however, a droplet discharging method (representatively an ink-jetting method) by which a predetermined material is dropped can eliminate the waste of the material. Further, the color filter 322 and the like are provided in a region where the switching TFT 303 is not provided. That is to say, the color filter 322 is provided so as to face a light-transmissive region, that is an opening region. It is to be noted that the color filter and the like may be formed of materials which exhibit red (R), green (G), and blue (B) in the case where a liquid crystal display device performs full-color display, and a material which exhibits at least one color in the case of mono-color display. A liquid crystal element is an element capable of changing an alignment of liquid crystals by a voltage between a pair of electrodes, and refers to the pixel electrode 306, a counter electrode 323, and a liquid crystal layer between them in this embodiment mode.

It is to be noted that the color filter is not provided in some cases when a diode (LED) of RGB and the like are arranged in a backlight, and a successive additive color mixing method (field sequential method) in which color display is performed by time division. The black matrix 324 is provided to reduce reflection of external light due to the wiring of the switching TFT 303 and the CMOS circuit 354. Therefore, the black matrix 324 is provided so as to cover the switching TFT 303 or the CMOS circuit 354. Note that the black matrix 324 may be provided so as to cover the capacitor 304. Accordingly, reflection by a metal film constituting the capacitor 304 can be prevented.

Then, the counter electrode 323 and an alignment film 326 are provided. The alignment film 326 is subjected to rubbing treatment. This rubbing treatment is not performed in some cases in a specific mode of a liquid crystal. For example, the treatment is not required to be performed in the case of a VA mode.

It is to be noted that the wire included in the TFT, the gate electrode, the pixel electrode 306, and the counter electrode 323 can be selected from indium tin oxide (ITO), IZO (indium zinc oxide) in which zinc oxide (ZnO) is mixed in indium oxide, a conductive material in which silicon oxide ($SiO_2$) is mixed in indium oxide, organic indium, organotin, a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), or copper (Cu), an alloy thereof, and metal nitride thereof.

Such an counter substrate 320 is attached to the substrate 301 by using a sealing material 328. The sealing material 328 can be drawn over the substrate 301 or the counter substrate 320 by using a dispenser or the like. Further, a spacer 325 is provided in a part of the pixel portion 205 and the driver circuit portion 208 in order to hold a space between the substrate 301 and the counter substrate 320. The spacer 325 has a shape such as a columnar shape or a spherical shape.

A liquid crystal 311 is injected between the substrate 301 and the counter substrate 320 attached to each other in this manner. It is preferable to inject the liquid crystal in vacuum. The liquid crystal 311 can be formed by a method other than the injecting method. For example, the liquid crystal 311 may be dropped and then the counter substrate 320 may be attached. Such a dropping method is preferably employed when using a large substrate to which the injecting method cannot be applied easily.

The liquid crystal 311 includes a liquid crystal molecule of which tilt is controlled by the pixel electrode 306 and the counter electrode 323. Specifically, the tilt of the liquid crystal molecule is controlled by a voltage applied to the pixel electrode 306 and the counter electrode 323. Such a control is preformed using a control circuit provided in the driver circuit portion 208. It is to be noted that the control circuit is not necessarily formed over the substrate 301 and a circuit connected through a connecting terminal 310 may be used. In this case, an anisotropic conductive film containing conductive particles can be used so as to be connected to the connecting terminal 310. Further, the counter electrode 323 is electrically connected to a part of the connecting terminal 310, thereby a potential of the counter electrode 323 can be common. For example, a bump 337 can be used for the conduction.

Next, description is made of a structure of a backlight unit 352. The backlight unit 352 includes a cold cathode tube, a hot cathode tube, a diode, an inorganic EL, or an organic EL as a light source 331 which emits fluorescence, a lamp reflector 332 to effectively lead fluorescence to a light guide plate 335, the light guide plate 335 by which light is totally reflected and led to the entire surface, a diffusing plate 336 for reducing variations in brightness, and a reflective plate 334 for reusing light leaked under the light guide plate 335.

A control circuit for controlling the luminance of the light source 331 is connected to the backlight unit 352. The luminance of the light source 331 can be controlled by a signal supplied from the control circuit.

Further, stacked polarizing plates 316 are provided between the substrate 301 and the backlight unit 352 and stacked polarizing plates 321 are provided over the counter substrate 320 as well. The polarizing plates 316 and 321 may be stacked while having a retardation film and are attached to the substrate 301 and the counter substrate 320, respectively.

By providing stacked polarizing plates in such a liquid crystal display device, a contrast ratio can be enhanced since a decrease in transmittance of black display is larger than that of white display, as compared to the case of a single polarizing plate.

In this embodiment mode, description is made using a display device having a liquid crystal element; however, the invention can be applied to a light emitting device having a self-light emitting element as well. A display element in a light emitting device is an element in which light emission is controlled by a voltage or a current between a pair of electrodes, and refers to an anode, a cathode, a light emitting layer between them, and the like. When the light emitting device has a structure where both of a pair of substrates facing each other are transparent substrates and light is emitted in both directions, stacked polarizing plates are provided outside each of the substrates, thereby a contrast ratio can be enhanced. The light emitting device can be a display device which has higher moving image response speed and thinner shape than a liquid crystal display device.

Further, a combination of a polarizing plate and a retardation film can function to widen a viewing angle or prevent reflection by a circularly polarizing plate. Even in the case of a structure where a retardation film is provided between a polarizing plate and a substrate, a contrast ratio can be enhanced since a feature of the invention is stacked polarizing plates.

Embodiment Mode 3

In this embodiment mode, description is made of a liquid crystal display device which has a polarizing plate having a stacked-layer structure but uses a TFT having an amorphous semiconductor film unlike in the case of the aforementioned embodiment modes.

Figure 3:
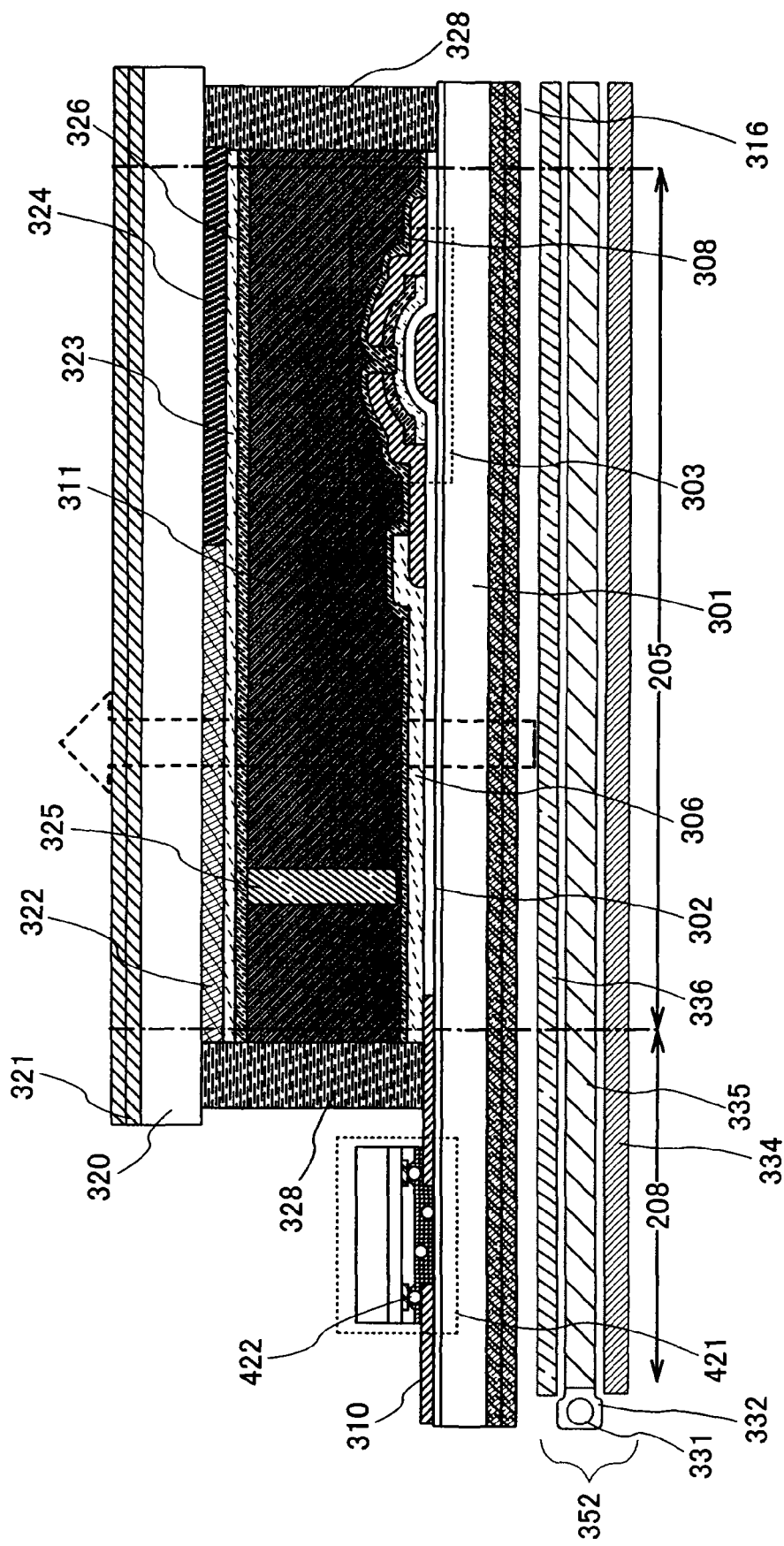
FIG. 3 is a cross sectional view showing a display device of the invention.

FIG. 3 shows a structure of a liquid crystal display device including a transistor using an amorphous semiconductor film for a switching element (hereinafter referred to as an amorphous TFT). The pixel portion 205 is provided with the switching TFT 303 formed of an amorphous TFT. The amorphous TFT can be formed by a known method. For example, in the case of forming a channel-etch type, a gate electrode is formed over the base film 302; a gate insulating film is formed so as to cover the gate electrode; and then, an amorphous semiconductor film, an n-type semiconductor film, a source electrode, and a drain electrode are formed. An opening is formed in the n-type semiconductor film by using the source electrode and the drain electrode. A part of the amorphous semiconductor film is also removed in this case; therefore, this TFT is referred to as a channel-etch type. After that, a protective film is formed, thereby an amorphous TFT can be formed. Further, there is also a channel protective type amorphous TFT where a protective film is provided so that an amorphous semiconductor film is not removed when forming an opening in the n-type semiconductor film by using the source electrode and the drain electrode. Other structures may be formed similarly to the channel-etch type.

Subsequently, the alignment film 308 is formed similarly to FIG. 2, and then rubbing treatment is performed. This rubbing treatment is not performed in some cases in a specific mode of a liquid crystal. For example, the treatment is not required to be performed in the case of a VA mode.

Further, the counter substrate 320 is provided similarly to FIG. 2 and attached by using the sealing material 328. By injecting the liquid crystal 311 between them, a liquid crystal display device can be formed.

Similarly to FIG. 2, the stacked polarizing plates 316 are provided between the substrate 301 and the backlight unit 352 and the stacked polarizing plates 321 are provided over the counter substrate 320 as well. The polarizing plates 316 and 321 may be stacked while having a retardation film and are attached to the substrate 301 and the counter substrate 320 respectively.

In the case of forming a liquid crystal display device by using an amorphous TFT as the switching TFT 303, an IC 421 formed of a silicon wafer can be mounted as a driver on the driver circuit portion 208 in consideration of operating performance. For example, a signal to control the switching TFT 303 can be supplied by connecting a wire of the IC 421 and a wire connected to the switching TFT 303 by using an anisotropic conductor having a conductive particle 422. It is to be noted that a mounting method of the IC is not limited to this and the IC may be mounted by a wire bonding method.

Further, the IC can be connected to a control circuit through the connecting terminal 310. At this time, an anisotropic conductive film having the conductive particle 422 can be used to connect the IC with the connecting terminal 310.

Since other structures are similar to FIG. 2, description thereof is omitted here.

By providing stacked polarizing plates in such a liquid crystal display device, a contrast ratio can be enhanced since a decrease in transmittance of black display is larger than that of white display, as compared to the case of a single-layer polarizing plate.

Embodiment Mode 4

Driving methods of a liquid crystal of a liquid crystal display device include a vertical electric field method where a voltage is applied perpendicularly to a substrate and a horizontal electric field method where a voltage is applied in parallel to a substrate. The structure of the invention, in which a plurality of polarizing plates are provided, can be applied to either the vertical electric field method or the horizontal electric field method. In this embodiment mode, description is made of modes where stacked polarizing plates of the invention are applied to various kinds of liquid crystal modes.

First, FIGS. 6A and 6B are pattern diagrams each showing a liquid crystal display device of a TN mode.

Similarly to FIG. 1A, the layer 100 having a liquid crystal element is sandwiched between the first substrate 101 and the second substrate 102 which are provided so as to face each other. Then, the first polarizing plate 103 and the second polarizing plate 104 are provided on the first substrate 101 side, while the third polarizing plate 105 and the fourth polarizing plate 106 are provided on the second substrate 102 side. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state. A first electrode 108 and a second electrode 109 are provided over the first substrate 101 and the second substrate 102, respectively. In addition, an electrode on the side opposite to the backlight, that is on the side of display surface, such as the second electrode 109 is formed so as to have at least a light transmitting property.

In the case where a liquid crystal display device having such a structure is in a normally white mode, when a voltage is applied to the first electrode 108 and the second electrode 109 (referred to as a vertical electric field method), black display is performed as shown in FIG. 6A. At that time, liquid crystal molecules are aligned vertically. Thus, light from the backlight cannot pass through the substrate, which leads to black display.

As shown in FIG. 6B, when a voltage is not applied between the first electrode 108 and the second electrode 109, white display is performed. At that time, liquid crystal molecules are aligned horizontally while twisted on a plane surface. As a result, light from the backlight can pass through the substrate provided with stacked polarizing plates, thereby a predetermined image is displayed. By providing a color filter at that time, full-color display can be performed. The color filter can be provided on either the first substrate 101 side or the second substrate 102 side.

A known liquid crystal material may be used for a TN mode.

FIGS. 7A and 7B are pattern diagrams each showing a liquid crystal display device of a VA mode. A VA mode is a mode where liquid crystal molecules are aligned perpendicularly to a substrate when there is no electric field.

Similarly to FIGS. 6A and 6B, the first electrode 108 and the second electrode 109 are provided over the first substrate 101 and the second substrate 102, respectively. In addition, an electrode on the side opposite to the backlight, that is on the side of a display surface, such as the second electrode 109 is formed so as to have at least light transmitting property. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state.

When a voltage is applied to the first electrode 108 and the second electrode 109 (vertical electric field method) in a liquid crystal display device having such a structure, white display is performed, which means an on state, as shown in FIG. 7A. At that time, liquid crystal molecules are aligned horizontally. Thus, light from the backlight can pass through the substrate provided with the stacked polarizing plates, thereby a predetermined image is displayed. By providing a color filter at that time, full-color display can be performed. The color filter can be provided on either the first substrate 101 side or the second substrate 102 side.

As shown in FIG. 7B, when a voltage is not applied to the first electrode 108 and the second electrode 109, black display is performed, which means an off state. At that time, liquid crystal molecules are aligned vertically. Thus, light from the backlight cannot pass through the substrate, which leads to black display.

Thus, in an off state, liquid crystal molecules are perpendicular to a substrate, thereby black display is performed. Meanwhile, in an on state, liquid crystal molecules are parallel to a substrate, thereby white display is performed. In an off state, liquid crystal molecules rise; therefore, polarized light from the backlight passes through a cell without being affected by birefringence of the liquid crystal molecules, and can be completely blocked by a polarizing plate on a counter substrate side. Accordingly, further enhancement of contrast is anticipated by providing stacked polarizing plates. The stacked polarizing plates of the invention can be applied to an MVA mode where liquid crystals are aligned symmetrically.

A known liquid crystal material may be used for a VA mode or an MVA mode.

FIGS. 8A and 8B are pattern diagrams each showing a liquid crystal display device of an OCB mode. In the OCB mode, alignment of liquid crystal molecules forms a compensation state optically in a liquid crystal layer, which is referred to as a bend orientation.

Similarly to FIGS. 6A and 6B, the first electrode 108 and the second electrode 109 are provided over the first substrate 101 and the second substrate 102 respectively. In addition, an electrode on the side opposite to the backlight, that is on the side of a display surface, such as the second electrode 109 is formed so as to have at least light transmitting property. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state.

When a voltage is applied to the first electrode 108 and the second electrode 109 (vertical electric field method) in a liquid crystal display device having such a structure, black display is performed as shown in FIG. 8A. At that time, liquid crystal molecules are aligned vertically. Thus, light from the backlight cannot pass through the substrate, which leads to black display.

When a voltage is not applied between the first electrode 108 and the second electrode 109, white display is performed as shown in FIG. 8B. At that time, liquid crystal molecules are aligned in an arching line. Thus, light from the backlight can pass through the substrate provided with stacked polarizing plates, thereby a predetermined image is displayed. By providing a color filter at that time, full-color display can be performed. The color filter can be provided on either the first substrate 101 side or the second substrate 102 side.

In such an OCB mode, birefringence caused in a liquid crystal layer is compensated with the stacked polarizing plates. Accordingly, a wider viewing angle can be realized, and needless to say, contrast can be enhanced.

Figure 9A:
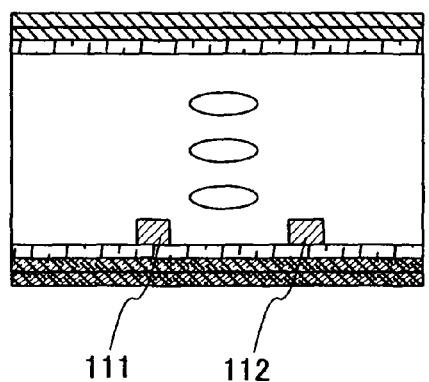
FIGS. 9A and 9B are views each showing a mode of a display device of the invention.
Figure 9B:
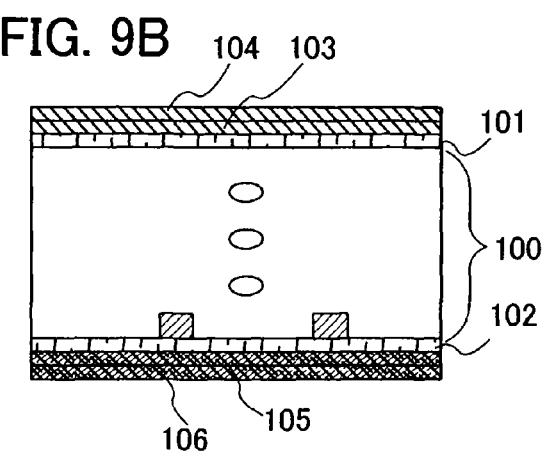

FIGS. 9A and 9B are pattern diagrams each showing a liquid crystal display device of an IPS mode. In the IPS mode, liquid crystal molecules are rotated necessarily on a plane surface with respect to a substrate, and a horizontal electric field method where electrodes are provided on one substrate side is employed.

In the IPS mode, a liquid crystal is controlled by a pair of electrodes provided over one substrate. Therefore, a pair of electrodes 111 and 112 are provided over the second substrate 102. The pair of electrodes 111 and 112 preferably have light transmitting property. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state.

When a voltage is applied to the pair of electrodes 111 and 112 in a liquid crystal display device having such a structure, white display is performed, which means an on state, as shown in FIG. 9A. Thus, light emitted from the backlight can pass through the substrate provided with stacked polarizing plates, thereby a predetermined image is displayed. By providing a color filter at that time, full-color display can be performed. The color filter can be provided on either the first substrate 101 side or the second substrate 102 side.

When a voltage is not applied between the pair of electrodes 111 and 112, black display is performed, which means an off state, as shown in FIG. 9B. At that time, liquid crystal molecules are aligned along a rubbing direction. Thus, light from the backlight cannot pass through the substrate, which leads to black display.

A known liquid crystal material may be used for the IPS mode.

In the case where stacked polarizing plates of the invention are applied to a liquid crystal display device of the vertical electric field method, display with a higher contrast ratio can be performed. The vertical electric field method is suitable for a display device for a computer and a large-sized television which are used indoors.

In a case where stacked polarizing plates of the invention are applied to a liquid crystal display device of the horizontal electric field method, display with a wider viewing angle and a higher contrast ratio can be realized. The horizontal electric field method is preferable for a portable display device.

It is to be noted that the invention can be applied to an FLC (ferroelectric liquid crystal) mode and an AFLC (antiferroelectric liquid crystal) mode, as well.

FIGS. 10A and 10B are pattern diagrams each showing a liquid crystal display device of the FLC mode and the AFLC mode.

Similarly to FIGS. 6A and 6B, the first electrode 108 and the second electrode 109 are provided over the first substrate 101 and the second substrate 102 respectively. In addition, an electrode on the side opposite to the backlight, that is on the side of a display surface, such as the second electrode 109 is formed so as to have at least light transmitting property. The first polarizing plate 103 and the second polarizing plate 104 are arranged so as to be in a parallel nicol state. The third polarizing plate 105 and the fourth polarizing plate 106 are arranged so as to be in a parallel nicol state, as well. The first polarizing plate 103 and the third polarizing plate 105 are arranged so as to be in a cross nicol state.

When a voltage is applied to the first electrode 108 and the second electrode 109 (referred to as the vertical electric field method) in a liquid crystal display device having such a structure, black display is performed as shown in FIG. 10A. At that time, liquid crystal molecules are aligned horizontally. Thus, light from the backlight cannot pass the substrate, which leads to black display.

When a voltage is not applied between the first electrode 108 and the second electrode 109, white display is performed as shown in FIG. 10B. At that time, liquid crystal molecules are aligned horizontally at a different angle from that in the case of applying a voltage. Thus, light from the backlight can pass through the substrate provided with stacked polarizing plates, thereby a predetermined image is displayed. By providing a color filter at that time, full-color display can be performed. The color filter can be provided on either the first substrate 101 side or the second substrate 102 side.

A known liquid crystal material may be used for the FLC mode and the AFLC mode.

Besides, the invention can be applied to a liquid crystal display device of a rotation mode, a scattering mode, or a birefringence mode, and a display device in which a polarizing plate is provided on each side of a substrate.

Embodiment Mode 5

In this embodiment mode, a structure of a backlight is described. A backlight is provided in a display device as a backlight unit having a light source, and the light source of the backlight unit is surrounded by a reflection plate for scattering light efficiently.

Figure 5A:
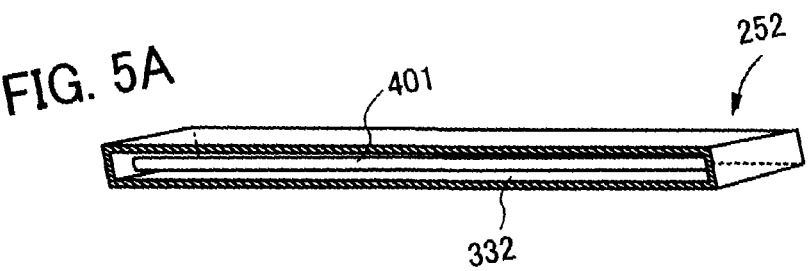
FIGS. 5A to 5D are views each showing a lighting unit included in a display device of the invention.

As shown in FIG. 5A, a cold cathode tube 401 can be used as a light source of a backlight unit 252. In addition, the lamp reflector 332 can be provided to reflect light from the cold cathode tube 401 efficiently. The cold cathode tube 401 is often used for a large display device for intensity of luminance from the cold cathode tube. Therefore, such a backlight unit having a cold cathode tube can be used for a display of a personal computer.

Figure 5B:
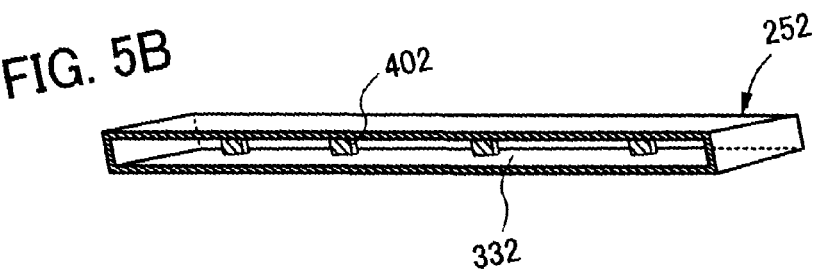

As shown in FIG. 5B, a diode (LED) can be used as light sources of the backlight unit 252. For example, diodes (W) 402 which emit white light are provided at the predetermined intervals. In addition, the lamp reflector 332 can be provided to reflect light from the diode (W) 402 efficiently.

Figure 5C:
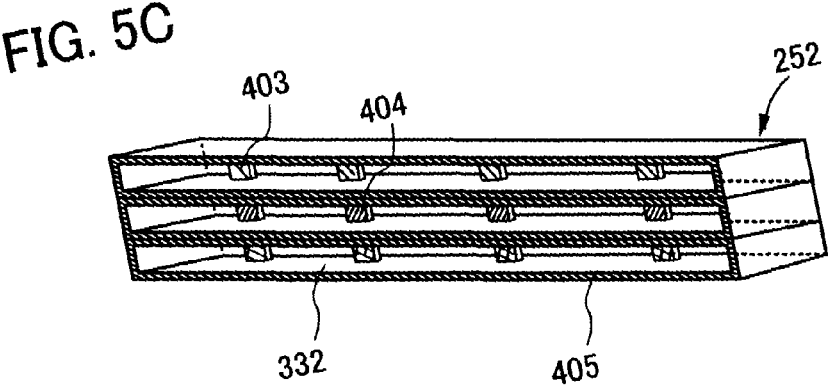

As shown in FIG. 5C, diodes (LED) 403, 404, and 405 of RGB colors can be used as light sources of the backlight unit 252. By using the diodes (LED) 403, 404, and 405 of RGB colors, higher color reproducibility can be realized in comparison with the case where only the diode (W) 402 which emits white light is used. In addition, the lamp reflector 332 can be provided to reflect light from the diodes (LED) 403, 404, and 405 of RGB colors efficiently.

Figure 5D:
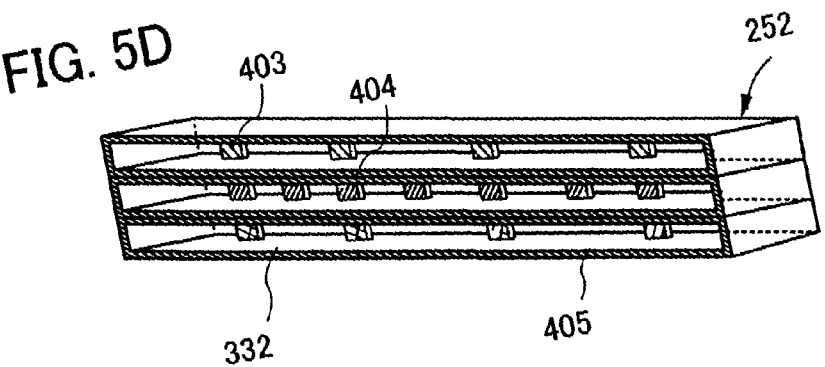

Further, as shown in FIG. 5(D), in the case where the diodes (LED) 403, 404, and 405 of RGB colors are used as light sources, the number and arrangement of them are not necessarily the same. For example, a plurality of diodes of a color having low emission intensity (for example, green) may be arranged.

Further, the diode (W) 402 which emits white light may be used in combination with the diodes (LED) 403, 404, and 405 of RGB colors.

Note that in the case of having the diodes of RGB colors, the diodes sequentially emit light in accordance with time by applying a field sequential mode, thereby color display can be performed.

Using a diode is suitable for a large display device since luminance is high. Further, purity of RGB colors is high; therefore, a diode has excellent color reproducibility as compared to a cold cathode tube. In addition, an area required for arrangement can be reduced; therefore, a narrower frame can be achieved when a diode is applied to a small display device.

Further, a light source is not necessarily provided as the backlight unit shown in FIGS. 5A to 5D. For example, in the case where a backlight having a diode is mounted on a large display device, the diode can be arranged on a back side of the substrate. In this case, the diodes of RGB colors can be sequentially arranged at predetermined intervals. Depending on arrangement of the diodes, color reproducibility can be enhanced.

Stacked polarizing plates are provided in such a display device using a backlight, thereby an image with a high contrast ratio can be produced. In particular, a backlight having a diode is suitable for a large display device. By enhancing a contrast ratio of a large display device, high-quality image can be produced even in a dark place.

Embodiment Mode 6

In this embodiment mode, description is made of operation of each circuit or the like included in a liquid crystal display device.

Figure 4A:
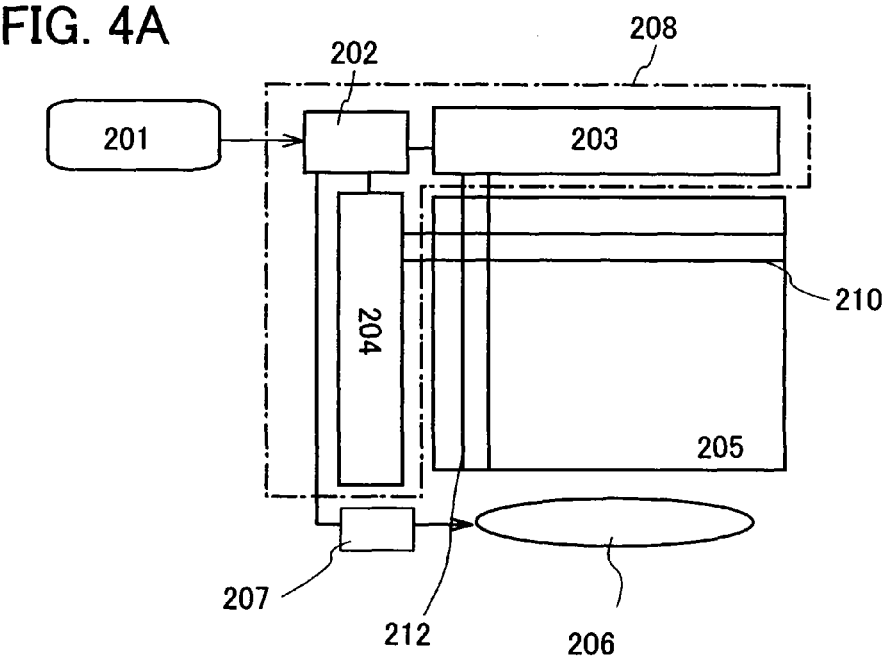
FIGS. 4A to 4C are block diagrams each showing a display device of the invention.
Figure 4B:
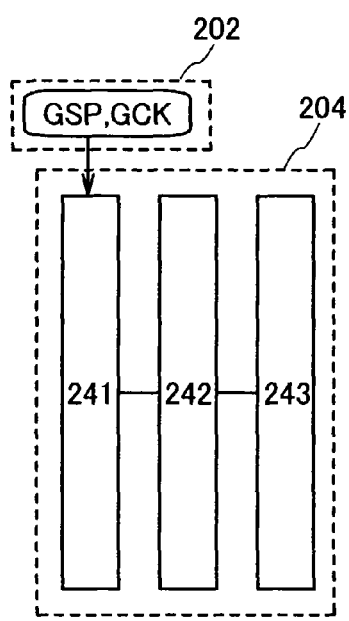
Figure 4C:
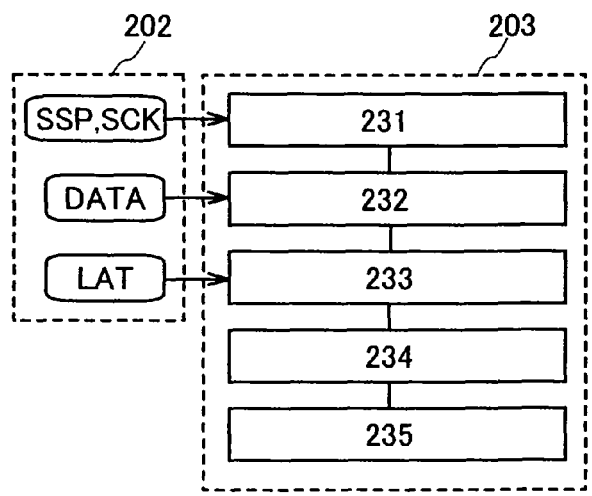

FIGS. 4A to 4C show system block diagrams of the pixel portion 205 and the driver circuit portion 208 included in a liquid crystal display device.

In the pixel portion 205, a plurality of pixels are included and switching elements are provided in an intersecting region of the signal line 212 and the scan line 210. By the switching elements, application of a voltage to control tilt of liquid crystal molecules can be controlled. Such a structure where switching elements are provided in respective intersecting regions is referred to as an active type. The pixel portion of the invention is not limited to such an active type, and may have a passive type structure instead. The passive type can be formed by a simple process since each pixel does not have a switching element.

The driver circuit portion 208 includes the control circuit 202, the signal line driver circuit 203, and the scan line driver circuit 204. The control circuit 202 has a function to control a gray scale in accordance with display contents of the pixel portion 205. Therefore, the control circuit 202 inputs a signal generated in accordance with a video signal 201, to the signal line driver circuit 203 and the scan line driver circuit 204. When a switching element is selected through the scan line 210 in accordance with the scan line driver circuit 204, a voltage is applied to a pixel electrode in a selected intersecting region. The value of this voltage is determined in accordance with a signal inputted from the signal line driver circuit 203 through the signal line 212.

Further, in the control circuit 202, a signal to control power supplied to a lighting unit 206 is generated, and the signal is inputted to the power source 207 of the lighting unit 206. The backlight unit described in the aforementioned embodiment mode can be used for the lighting unit. Note that the lighting unit includes a front light besides a backlight. A front light is a platy light unit formed of an illuminant and a light guiding body, which is attached to a front side of a pixel portion and illuminates the whole place. By such a lighting unit, the pixel portion can be evenly illuminated with low power consumption.

Further, as shown in FIG. 4B, the scan line driver circuit 204 includes circuits which function as a shift register 241, a level shifter 242, and a buffer 243. Signals such as a gate start pulse (GSP) and a gate clock signal (GCK) are inputted to the shift register 241. It is to be noted that the scan line driver circuit of the invention is not limited to the structure shown in FIG. 4B.

Further, as shown in FIG. 4C, the signal line driver circuit 203 includes circuits which function as a shift register 231, a first latch 232, a second latch 233, a level shifter 234, and a buffer 235. The circuit functioning as the buffer 235 is a circuit having a function to amplify a weak signal and includes an operational amplifier and the like. Signals such as start pulses (SSP) or clock signal (SCK) are inputted to the shift register 231, and data (DATA) such as video signals is inputted to the first latch 232. Latch (LAT) signals can be temporarily held in the second latch 233, and are inputted to the pixel portion 205 concurrently. This operation is referred to as a line sequential drive. Therefore, a pixel which performs not a line sequential drive but a dot sequential drive does not require the second latch. Thus, the signal line driver circuit of the invention is not limited to the structure shown in FIG. 4C.

The signal line driver circuit 203, the scan line driver circuit 204, and the pixel portion 205 as described above can be formed of semiconductor elements provided over one substrate. The semiconductor element can be formed using a thin film transistor provided over a glass substrate. In this case, a crystalline semiconductor film may be applied to a semiconductor element (see Embodiment Mode 2). A crystalline semiconductor film can constitute a circuit included in a driver circuit portion since it has high electrical characteristics, in particular, mobility. Further, the signal line driver circuit 203 and the scan line driver circuit 204 may be mounted on a substrate by using an IC (Integrated Circuit) chip. In this case, an amorphous semiconductor film can be applied to a semiconductor element in a pixel portion (see Embodiment Mode 3).

By providing stacked polarizing plates in such a liquid crystal display device, a contrast ratio can be enhanced. That is, by the stacked polarizing plates, a contrast ratio of light from the lighting unit controlled by the control circuit can be enhanced.

Embodiment 1

In this embodiment, description is made of an experiment using a polarizing plate and a result of the experiment.

First, an experiment is conducted for showing that a contrast ratio is enhanced in the case of using stacked polarizing plates as compared to the case of using a normal polarizing plate. As shown in FIG. 11, a polarizing plate (Pol) is provided over a backlight (BL), and transmitted light is measured using a color luminance meter BM5A. NPF-EG1425DU (manufactured by Nitto Denko Corporation) is used for the polarizing plate, and an area of the backlight is 3 cm×5 cm.

Table 1 shows conditions for providing a polarizing plate and a result of transmittance.

TABLE 1

| condition | arrangement | A | B [%] | C [%] | D |
|---|---|---|---|---|---|
| 1 | BL | 0 | | | |
| 2 | BL\Pol | 1 | | | |
| 3 | BL\Pol * Pol | 2 | 88 | | 1851 |
| 4 | BL\Pol\Pol * Pol | 3 | 88 | 72 | 2276 |
| 5 | BL\Pol\Pol * Pol\Pol | 4 | 88 | 15 | 13702 |
| 6 | BL\Pol\Pol\Pol * Pol\Pol | 5 | 88 | 71 | 16941 |
| 7 | BL\Pol\Pol\Pol * Pol\Pol\Pol | 6 | 88 | 140 | 10614 |
| 8 | BL\Pol\Pol\Pol\Pol * Pol\Pol\Pol | 7 | 88 | 100 | 9386 |
| 9 | BL\Pol\Pol\Pol\Pol * Pol\Pol\Pol\Pol | 8 | 88 | 100 | 8257 |

BL: backlight, Pol: polarizing plate
A: number of polarizing plates
B: rate of change in transmittance in parallel state
C: rate of change in transmittance in perpendicular state
D: transmittance in parallel state/transmittance in perpendicular state As shown in Table 1, conditions 1 to 9 specify the number of a polarizing plate sequentially from 0 to 8. A specific method for providing polarizing plates is as follows: for example, a polarizing plate is provided on a backlight side as the condition 2, and then a polarizing plates is provided on a viewing side as the condition 3. A detailed arrangement is shown in arrangement rows of Table 1. In this case, polarizing plates are stacked while being attached to a glass substrate. Note that it is assumed that the glass substrate has high transmittance, which does not affect a result of this experiment.

In this experiment, when one polarizing plate is provided as in the condition 2, transmittance from the backlight becomes half (50%). It is known that when a polarizing plate is provided, transmittance is lowered.

Since the number of polarizing plates is two or more from the condition 3 to the condition 9, luminance in a parallel state (parallel nicol state) and luminance in a perpendicular state (cross nicol state) are measured, and each transmittance is calculated. The parallel state and the perpendicular state respectively refer to a case where absorption axes of a polarizing plate listed on one side of an asterisk and those on the other side of the asterisk are parallel and a case where they are perpendicular, in arrangement rows in Table 1. A decrease (or an increase) of transmittance each time a polarizing plate is added, that is, transmittance with respect to the amount of transmitted light of the immediately preceding condition (also referred to as a rate of change in transmittance (%)) is shown. A result in the parallel state is shown from the condition 3 where the number of polarizing plates is two or more, whereas a result in the perpendicular state is shown from the condition 4 where the number of polarizing plates is three or more.

Furthermore, a result is shown in the condition 3 to the condition 9 in which the number of polarizing plates is two or more as a ratio of transmittance in a parallel state to transmittance in a perpendicular state (transmittance in a parallel state/transmittance in a perpendicular state) in the case where luminance of the backlight is 100%. It is to be noted that the ratio of transmittance in a parallel state to transmittance in a perpendicular state correlates with a ratio of luminance of a state where white display is performed to a state where black display is performed in a display device. Therefore, the ratio of transmittance in a parallel state to transmittance in a perpendicular state can be evaluated as a contrast ratio.

From a result of Table 1, it is seen that the ratio of transmittance in a parallel state to transmittance in a perpendicular state is gradually increased as the number of polarizing plates increases, and decreased when the number of polarizing plates reaches 5. That is, in the case of providing four polarizing plates and the case of providing five polarizing plates, the ratio of transmittance in a parallel state to transmittance in a perpendicular state becomes high.

Further, it is concerned that using stacked polarizing plates for a display device leads to dark display since transmittance is gradually lowered by stacking polarizing plates. However, according to the result of Table 1, a rate of change in transmittance in the parallel state corresponding to white display does not change so largely even when the number of polarizing plates to be stacked is increased. Specifically, a rate of change in transmittance in the parallel state is kept to 88% even when one polarizing plate is added. That is, the stacked polarizing plates have a feature in that a rate of change in transmittance in the parallel state is kept to 85% or higher and the rate of change in transmittance is not lowered. On the other hand, a rate of change in transmittance in the perpendicular state corresponding to black display is decreased to 15% when the number of polarizing plates to be stacked is increased from 3 to 4. After that, in particular, when six or more polarizing plates are provided, a rate of change in transmittance in the perpendicular state does not change or is increased. That is, when four polarizing plates are stacked, a rate of change in transmittance in the perpendicular state becomes 20% or lower, and the rate of change in transmittance is lowered as compared to a rate of change in transmittance in the parallel state. As a result, a contrast ratio is increased.

Based on the aforementioned, four or five polarizing plates are preferably provided in total, and black can be displayed more darkly while white is not displayed so darkly. That is, it is found that a contrast ratio of a display device can be enhanced in the case where four or five polarizing plates are provided.

Thus, it is found that stacked polarizing plates are advantageous in that a contrast ratio is enhanced. However, it is not only necessary to simply stack many polarizing plates. In the case where four or five polarizing plates are stacked in total, a significant effect can be obtained, which is enhancement of a contrast ratio.

Embodiment 2

In this embodiment, description is made of an experiment using a polarizing plate and a luminance increasing film and a result of the experiment. A luminance increasing film condenses light from a backlight toward a viewing side; therefore, luminance can be enhanced on a front face of the viewing side. It is checked if a contrast ratio can be enhanced by stacked polarizing plates even in the case of providing such a luminance increasing film.

BEFII 90/50 (hereinafter referred to as BEF) manufactured by Sumitomo 3M Ltd. is used as a luminance increasing film. A backlight, a first BEF, and a second BEF are sequentially provided and polarizing plates are stacked similarly to Embodiment 1. Note that the first BEF and the second BEF are stacked so that prism stripes thereof are perpendicular to each other. However, even a single BEF can increase luminance; therefore, the number of a BEF is not limited. Table 2 shows conditions for arrangement of a polarizing plate and BEFs and a result of transmittance. A parallel state and a perpendicular state respectively refer to a case where the arrangement direction of a polarizing plate listed on one side of an asterisk is parallel and a case where that of a polarizing plate listed on the other side is perpendicular, in arrangement rows in Table 2, similarly to Table 1.

TABLE 2

| condition | arrangement | A | B [%] | C [%] | D |
|---|---|---|---|---|---|
| 1 | BL | 0 | | | |
| 2 | BL\BEF × 2\Pol | 1 | | | |
| 3 | BL\BEF × 2\Pol * Pol | 2 | 86 | | 2276 |
| 4 | BL\BEF × 2\Pol\Pol * Pol | 3 | 87 | 53 | 3752 |
| 5 | BL\BEF × 2\Pol\Pol * Pol\Pol | 4 | 88 | 16 | 20411 |
| 6 | BL\BEF × 2\Pol\Pol\Pol * Pol\Pol | 5 | 88 | 100 | 17953 |
| 7 | BL\BEF × 2\Pol\Pol\Pol * Pol\Pol\Pol | 6 | 87 | 83 | 18827 |
| 8 | BL\BEF × 2\Pol\Pol\Pol\Pol * Pol\Pol\Pol | 7 | 88 | 120 | 13766 |
| 9 | BL\BEF × 2\Pol\Pol\Pol\Pol\Pol * Pol\Pol\Pol\Pol | 8 | 88 | 83 | 14561 |

BL: backlight, Pol: polarizing plate, BEF: luminance increasing film
A: number of polarizing plates
B: rate of change in transmittance in parallel state
C: rate of change in transmittance in perpendicular state
D: transmittance in parallel state/transmittance in perpendicular state As shown in Table 2, the number of polarizing plates is sequentially increased from 0 to 8 as each of the conditions 1 to 9. The polarizing plates are arranged similarly to Embodiment 1, and a detailed arrangement thereof is shown in the arrangement rows in Table 2.

In the case where a polarizing plate is provided as in the condition 2 in this experiment, transmittance from the backlight is lowered to approximately half (49%). Even in the case where a BEF is thus used, transmittance is lowered by the polarizing plate.

Further, Table 2 shows rates of change in transmittance in a parallel state and a perpendicular state, transmittance in the parallel state/transmittance in the perpendicular state, as a measurement result similar to Embodiment 1.

It can be seen from a result of Table 2 that a ratio of transmittance in the parallel state to transmittance in the perpendicular state is gradually increased as the number of polarizing plates is increased, and decreased after the number of polarizing plates reaches 4 to 6. In particular, when four polarizing plates are arranged, a ratio of transmittance in the parallel state to transmittance in the perpendicular state becomes the highest.

Further, it is concerned that using stacked polarizing plates for a display device leads to dark display as a whole since transmittance is gradually lowered by stacking polarizing plates. However, according to the result of Table 2, a rate of change in transmittance in the parallel state corresponding to white display does not decrease so greatly and is kept to approximately 88%, even when the number of polarizing plates to be stacked is increased. That is, the stacked polarizing plates have a feature in that a rate of change in transmittance in the parallel state is kept to 85% or higher and the rate of change in transmittance is not lowered. On the other hand, a rate of change in transmittance in the perpendicular state corresponding to black display is decreased to 16% when the number of polarizing plates to be stacked is increased from 3 to 4. After that, when five or seven polarizing plates are provided, a rate of change in transmittance in the perpendicular state does not change or is increased. That is, when four polarizing plates are stacked, a rate of change in transmittance in the perpendicular state becomes 20% or lower, and a rate of change in transmittance is lowered as compared to a rate of change in transmittance in the parallel state. As a result, a contrast ratio is increased.

Based on the aforementioned, four or five polarizing plates are preferably provided even when a BEF is provided in total, and black can be displayed more darkly while white is not displayed so darkly. That is, it is understood that a contrast ratio of a display device provided with a BEF can be enhanced in the case where four or five polarizing plates are provided.

Thus, it is understood that stacked polarizing plates are advantageous in that a contrast ratio is enhanced. However, it is not only necessary to simply stack many polarizing plates. In the case where four or five polarizing plates are stacked in total, a significant effect can be obtained, which is enhancement of a contrast ratio with respect to a display device provided with a BEF, as well.

Embodiment 3

In this embodiment, description is made of an experiment using a polarizing plate and a liquid crystal element of a VA mode and a result of the experiment. It is checked if a contrast ratio can be enhanced by stacked polarizing plates in the case of providing an actual liquid crystal element between the polarizing plates.

A VA mode liquid crystal element (VA cell) is used as a liquid crystal element, and a backlight, a polarizing plate, a VA cell, and a polarizing plate are arranged in this order. The polarizing plates sandwiching the VA cell are arranged so as to be in a cross nicol state, and the polarizing plates are stacked similarly to Embodiment 1. Then, luminance in the case where a rectangular voltage having a frequency of 60 Hz and an amplitude of −10 to +10 V is applied and luminance in the case where it is not applied are measured to calculate a rate of change in transmittance in a voltage applying state and a rate of change in transmittance in a non-voltage applying state. Further, a ratio of transmittance in the voltage applying state to transmittance in the non-voltage applying state (transmittance in the voltage applying state/transmittance in the non-voltage applying state) in the case where luminance of the backlight is set to 100% is also calculated. Table 3 shows conditions for arrangement of a VA cell and polarizing plates and a result of transmittance. A parallel state and a perpendicular state respectively refer to a case where the arrangement direction of a polarizing plate listed on one side of a "VA cell" is parallel and a case where that of a polarizing plate listed on the other side is perpendicular, in arrangement rows in Table 3.

TABLE 3

| condition | arrangement | A | B [%] | C [%] | D |
|---|---|---|---|---|---|
| 1 | BL\Pol\ VA cell \Pol | 2 | | | 789 |
| 2 | BL\Pol\Pol\VA cell\Pol | 3 | 88 | 52 | 1322 |
| 3 | BL\Pol\Pol\VA cell\Pol\Pol | 4 | 88 | 50 | 2322 |
| 4 | BL\Pol\Pol\Pol\VA cell\Pol\Pol | 5 | 88 | 91 | 2223 |
| 5 | BL\Pol\Pol\Pol\VA cell\Pol\Pol\Pol | 6 | 85 | 100 | 1886 |
| 6 | BL\Pol\Pol\Pol\Pol\VA cell\Pol\Pol\Pol | 7 | 90 | 104 | 1618 |
| 7 | BL\Pol\Pol\Pol\Pol\VA cell\Pol\Pol\Pol\Pol | 8 | 82 | 84 | 1644 |

BL: backlight, Pol: polarizing plate, VA cell: VA mode liquid crystal cell
A: number of polarizing plates
B: rate of change in transmittance in voltage applying state
C: rate of change in transmittance in non-voltage applying state
D: transmittance in voltage applying state/transmittance in non-voltage applying state As shown in Table 3, the conditions 1 to 7 specify the number of polarizing plates sequentially from 2 to 8 respectively. Arrangements of the polarizing plates are shown in an arrangement rows in Table 3.

It can be seen from a result of Table 3 that a ratio of transmittance in the voltage applying state to transmittance in the non-voltage applying state is gradually increased as the number of polarizing plates is increased, and gradually decreased after the number of polarizing plates reaches 4. In particular, when four polarizing plates are provided, a ratio of transmittance in the voltage applying state to transmittance in the non-voltage applying state becomes the highest.

Further, it is concerned that using stacked polarizing plates for a display device leads to dark display as a whole since transmittance is gradually lowered by stacking polarizing plates. However, according to a result of Table 3, a rate of change in transmittance in the voltage applying state corresponding to white display does not decrease so greatly and is kept to approximately 82% to 90%, even when the number of polarizing plates to be stacked is increased. That is, the stacked polarizing plates have a feature in that a rate of change in transmittance in the voltage applying state is kept to 82% or higher and the rate of change in transmittance is not lowered. On the other hand, a rate of change in transmittance in the non-voltage applying state corresponding to black display is decreased to 50% when the number of polarizing plates to be stacked is increased from 3 to 4. After that, when six or more polarizing plates are provided, a rate of change in transmittance in the non-voltage applying state does not change or is increased. That is, when four polarizing plates are stacked, a rate of change in transmittance in the non-voltage applying state becomes 50% or lower, and the a rate of change in transmittance is lowered as compared to a rate of change in transmittance in the voltage applying state.

Based on the aforementioned, four or five polarizing plates are preferably provided even when a VA cell is sandwiched, and black can be displayed more darkly while white is not displayed so darkly. That is, it is understood that a contrast ratio of a display device provided with a VA cell can be enhanced in the case where four or five polarizing plates are provided.

Thus, it is understood that stacked polarizing plates are advantageous in that a contrast ratio is enhanced. However, it is not only necessary to stack many polarizing plates. In the case where four or five polarizing plates are stacked in total, a significant effect can be obtained, which is enhancement of a contrast ratio of a display device provided with a sandwiched VA cell, as well.

This application is based on Japanese Patent Application serial no. 2005-321534 filed in Japan Patent Office on 4th, Nov., 2005, the entire contents of which are hereby incorporated by reference.

What is claimed is:

1. A display device comprising:
   a first light-transmissive substrate and a second light-transmissive substrate opposed to each other;
   a display element disposed between the first and second light-transmissive substrates;
   first stacked polarizing plates adjacent to the first light-transmissive substrate wherein the first light-transmissive substrate is located between the display element and the first stacked polarizing plates;
   second stacked polarizing plates adjacent to the second light-transmissive substrate wherein the second light-transmissive substrate is located between the display element and the second stacked polarizing plates,
   wherein absorption axes of the first stacked polarizing plates are arranged in a parallel nicol state,
   wherein absorption axes of the second stacked polarizing plates are arranged in a parallel nicol state, and
   wherein the absorption axes of the first stacked polarizing plates are arranged relative to the absorption axes of the second stacked polarizing plates in a cross nicol state.

2. The display device according to claim 1, wherein at least a first polarizing plate and a second polarizing plate in the first stacked polarizing plates are provided in contact with each other.

3. The display device according to claim 1, wherein the display element is a liquid crystal element.

4. The display device according to claim 1, further comprising a color filter provided between the first light-transmissive substrate and the second light-transmissive substrate.

5. The display device according to claim 1, further comprising a black matrix provided between the first light-transmissive substrate and the second light-transmissive substrate.

6. The display device according to claim 1, further comprising a thin film transistor formed over the first light-transmissive substrate.

7. The display device according to claim 6, wherein the thin film transistor comprises a crystalline semiconductor film as an active layer.

8. The display device according to claim 6, wherein the thin film transistor comprises an amorphous semiconductor film.

9. A display device comprising:
   a first light-transmissive substrate and a second light-transmissive substrate opposed to each other;
   a display element disposed between the first and second light-transmissive substrates;
   m first polarizing plates stacked adjacent to the first light-transmissive substrate wherein the first light-transmissive substrate is located between the display element and the first polarizing plates; and
   n second polarizing plates stacked adjacent to the second light-transmissive substrate wherein the second light-transmissive substrate is located between the display element and the second polarizing plates,
   wherein absorption axes of the first polarizing plates are arranged in a parallel nicol state,
   wherein absorption axes of the second polarizing plates are arranged in a parallel nicol state,
   wherein the absorption axes of the first polarizing plates are arranged relative to the absorption axes of the second polarizing plates in a cross nicol state such that the display device has a third transmittance,
   wherein a ratio between a first transmittance and a second transmittance is smaller than a ratio between the third transmittance and a fourth transmittance,
   wherein the first transmittance is associated with an arrangement having m first polarizing plates and n second polarizing plates arranged such that the absorption axes of the first polarizing plates are arranged relative to the absorption axes of the second polarizing plates in a parallel nicol state,
   wherein the second transmittance is associated with an arrangement having m-1 first polarizing plates and n second polarizing plates arranged such that the absorption axes of the first polarizing plates are arranged relative to the absorption axes of the second polarizing plates in a parallel nicol state,
   wherein the fourth transmittance is associated with an arrangement having m-1 first polarizing plates and n second polarizing plates arranged such that the absorption axes of the first polarizing plates are arranged relative to the absorption axes of the second polarizing plates in a cross nicol state, and
   wherein n and m are integers having values of two or more.

10. The display device according to claim 9, wherein at least a first polarizing plate and a second polarizing plate in the first polarizing plates are provided in contact with each other.

11. The display device according to claim 9, wherein the display element is a liquid crystal element.

12. The display device according to claim 9, further comprising a color filter provided between the first light-transmissive substrate and the second light-transmissive substrate.

13. The display device according to claim 9, further comprising a black matrix provided between the first light-transmissive substrate and the second light-transmissive substrate.

14. The display device according to claim 9, further comprising a thin film transistor formed over the first light-transmissive substrate.

15. The display device according to claim 14, wherein the thin film transistor comprises a crystalline semiconductor film as an active layer.

16. The display device according to claim 14, wherein the thin film transistor comprises an amorphous semiconductor film.

17. A display device comprising:
   a first light-transmissive substrate and a second light-transmissive substrate opposed to each other;
   a display element disposed between the first and second light-transmissive substrates;
   first stacked polarizing plates adjacent to the first light-transmissive substrate wherein the first light-transmissive substrate is located between the display element and the first stacked polarizing plates;

second stacked polarizing plates adjacent to the second light-transmissive substrate wherein the second light-transmissive substrate is located between the display element and the second stacked polarizing plates, wherein absorption axes of the first stacked polarizing plates are arranged in a parallel nicol state, wherein absorption axes of the second stacked polarizing plates are arranged in a parallel nicol state, wherein the absorption axes of the first stacked polarizing plates are arranged relative to the absorption axes of the second stacked polarizing plates in a cross nicol state, wherein a ratio of a first transmittance to a second transmittance is higher than a ratio of a third transmittance to a fourth transmittance, wherein the first transmittance is associated with an arrangement having the first stacked polarizing plates and the second stacked polarizing plates arranged such that the absorption axes of the first stacked polarizing plates are arranged relative to the absorption axes of the second stacked polarizing plates in a parallel nicol state, wherein the second transmittance is associated with an arrangement having the first stacked polarizing plates and the second stacked polarizing plates arranged such that the absorption axes of the first stacked polarizing plates are arranged relative to the absorption axes of the second stacked polarizing plates in a cross nicol state, wherein the third transmittance is associated with an arrangement having a first single-layer polarizing plate and a second single-layer polarizing plate arranged such that absorption axes of the first single-layer polarizing plate are arranged relative to absorption axes of the second single-layer polarizing plate in a parallel nicol state, and wherein the fourth transmittance is associated with an arrangement having the first single-layer polarizing plate and the second single-layer polarizing plate arranged such that the absorption axes of the first single-polarizing plate are arranged relative to the absorption axes of the second single-layer polarizing plate in a cross nicol state.

18. The display device according to claim 17, wherein at least a first polarizing plate and a second polarizing plate in the first stacked polarizing plates are provided in contact with each other.

19. The display device according to claim 17, wherein the display element is a liquid crystal element.

20. The display device according to claim 17, further comprising a color filter provided between the first light-transmissive substrate and the second light-transmissive substrate.

21. The display device according to claim 17, further comprising a black matrix provided between the first light-transmissive substrate and the second light-transmissive substrate.

22. The display device according to claim 17, further comprising a thin film transistor formed over the first light-transmissive substrate.

23. The display device according to claim 22, wherein the thin film transistor comprises a crystalline semiconductor film as an active layer.

24. The display device according to claim 22, wherein the thin film transistor comprises an amorphous semiconductor film.

* * * * *